United States Patent
Hirayama et al.

(10) Patent No.: US 8,891,040 B2
(45) Date of Patent: Nov. 18, 2014

(54) BACKLIGHT UNIT AND LIQUID CRYSTAL DISPLAY DEVICE

(75) Inventors: Yoshinobu Hirayama, Osaka (JP); Shigenori Tanaka, Osaka (JP); Ryoh Araki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 198 days.

(21) Appl. No.: 13/642,893

(22) PCT Filed: Feb. 23, 2011

(86) PCT No.: PCT/JP2011/054022
§ 371 (c)(1),
(2), (4) Date: Oct. 23, 2012

(87) PCT Pub. No.: WO2011/135907
PCT Pub. Date: Nov. 3, 2011

(65) Prior Publication Data
US 2013/0038817 A1    Feb. 14, 2013

(30) Foreign Application Priority Data

Apr. 27, 2010   (JP) .................................. 2010-102489

(51) Int. Cl.
*G02F 1/1335* (2006.01)
*F21S 2/00* (2006.01)

(52) U.S. Cl.
CPC ............. *F21S 2/00* (2013.01); *G02F 1/133605* (2013.01)
USPC ........................................................ 349/65

(58) Field of Classification Search
USPC ........................................................ 349/65
See application file for complete search history.

(56) References Cited

U.S. PATENT DOCUMENTS

| | | | |
|---|---|---|---|
| 2006/0146573 A1 | 7/2006 | Iwauchi et al. | |
| 2010/0053996 A1 | 3/2010 | Zhang et al. | |
| 2010/0302479 A1* | 12/2010 | Aronson et al. | ................. 349/64 |
| 2011/0026239 A1* | 2/2011 | Kim et al. | ..................... 362/97.1 |
| 2011/0109836 A1* | 5/2011 | Tanaka et al. | ..................... 349/61 |
| 2011/0157097 A1* | 6/2011 | Hamada et al. | ................. 345/175 |
| 2011/0157521 A1* | 6/2011 | Shimazaki et al. | ............. 349/65 |

FOREIGN PATENT DOCUMENTS

| | | | |
|---|---|---|---|
| JP | 05-019255 | A | 1/1993 |
| JP | 05-142538 | A | 6/1993 |
| JP | 11-242122 | A | 9/1999 |
| JP | 2001-014923 | A | 1/2001 |
| JP | 2004-296300 | A | 10/2004 |
| JP | 2006-294361 | A | 10/2006 |
| JP | 2010-056089 | A | 3/2010 |
| WO | 2004/055429 | A1 | 7/2004 |

OTHER PUBLICATIONS

Official Communication issued in International Patent Application No. PCT/JP2011/054022, mailed on May 17, 2011.

* cited by examiner

*Primary Examiner* — Timothy L Rude
(74) *Attorney, Agent, or Firm* — Keating & Bennett, LLP

(57) ABSTRACT

A liquid crystal display device (100) of the present invention includes an edge light type backlight unit (10) and a liquid crystal panel (20). The backlight unit (10) includes a light guide plate (2) and a light source (1) that emits light to a light entrance end surface (2a) of the light guide plate (2). An opposite end surface (2b), of the light guide plate (2), which is opposite to the light entrance end surface (2a), is shaped to have one or more triangular shape(s) or one or more rounded shape(s) in a cross section both in a thickness direction of the light guide plate (2) and in a peak luminance direction of light from the light source (1). Light parallel to the peak luminance direction, which light is from the light source (1), is suitably reflected without being scattered by an inclined surface of the opposite end surface (2b).

4 Claims, 3 Drawing Sheets

F I G. 1
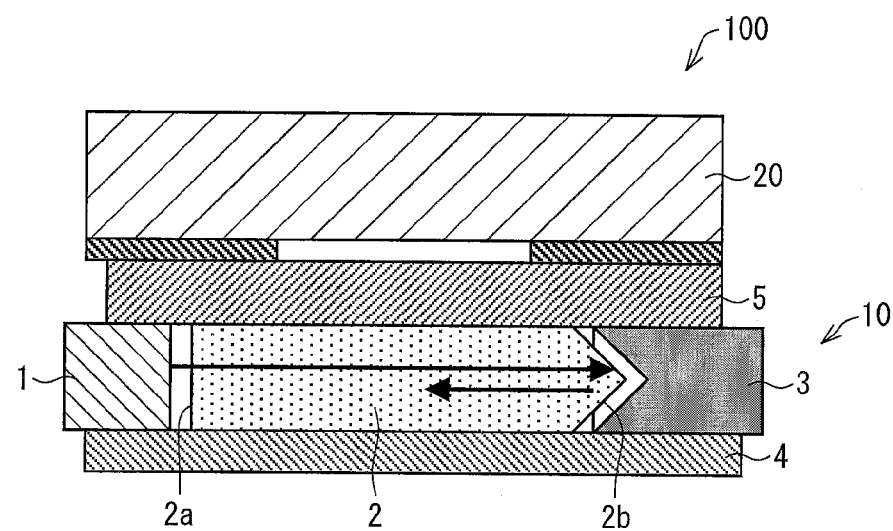
F I G. 2
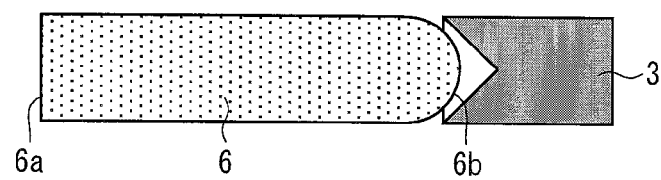

12a    12    12b 16a    16    16b

BACKLIGHT UNIT AND LIQUID CRYSTAL DISPLAY DEVICE

TECHNICAL FIELD

The present invention relates to an edge light type backlight unit and a liquid crystal display device including the edge light type backlight unit.

BACKGROUND ART

There are many liquid crystal display devices each of which contains a backlight unit to backlight a panel so as to realize a bright display screen.

In recent years, since mobile devices, such as mobile phones are becoming thinner, liquid crystal display devices included in the mobile devices are also required to be thinner. In order to meet this demand, there has been proposed an edge light type (side light type) backlight unit.

The following description discusses a conventional edge light type backlight unit with reference to FIG. 6. FIG. 6 is a cross-sectional view showing a liquid crystal display device 200 which includes a backlight unit 210. The backlight unit 210 includes (i) a light guide plate 202 that is provided so as to face a liquid crystal panel 220, (ii) a light source 201, such as an LED, which is provided along a side of the light guide plate 202, and (iii) a frame 203 which holds the light guide plate 202 and the light source 201. Light emitted from the light source 201 and entered the light guide plate 202 propagates through the light guide plate 202, and exits through the top surface of the light guide plate 202. The light illuminates the liquid crystal panel 220.

Note here that, according to the backlight unit 210 shown in FIG. 6, the light that has entered the light guide plate 202 suffers from light energy loss. For example, (i) light that has reached an end surface 202a, which is opposite a light incident surface of the light guide plate 202, is scattered due to roughness of the end surface 202a and/or (ii) light that leaked from the end surface 202a is scattered by the frame 203. As a result, light from the light source 201 is not fully utilized. Moreover, if such scattered light enters the liquid crystal panel 230, the light is displayed as a bright line. This causes another problem of reducing display quality of the liquid crystal display device 200.

The Patent Literature 1 discloses a technique to reduce light that is scattered in a light guide plate. FIG. 7 shows a backlight unit 310 described in Patent Literature 1. As shown in FIG. 7, according to the backlight unit 310, a reflective diffraction element 303 is provided on an end surface 302a of a light guide plate 302, which end surface 302a is on the side opposite to a light source 301. This causes light that has conventionally escaped from the end surface 302a to be diffracted by the reflective diffraction element 303, and to be outputted through the top surface of the light guide plate 302. This improves light use efficiency of the backlight unit 310.

CITATION LIST

Patent Literature

Patent Literature 1
Japanese Patent Application Publication, Tokukai, No. 2006-294361 A (Publication Date: Oct. 26, 2006)

SUMMARY OF INVENTION

Technical Problem

However, when the technique disclosed in Patent Literature 1 is to be employed, the following problem occurs. That is, since liquid crystal display devices are becoming thinner, a light guide plate in a backlight unit is also becoming thinner. In recent years, the thickness of a light guide plate is as small as approximately 0.3 mm to 0.6 mm. It is technically difficult and costs much to provide a reflective diffraction grating on an end surface of such a thin light guide plate.

The present invention has been made in view of the above problem, and an object of the present invention is to provide (i) a backlight unit in which light use efficiency is improved with a simple arrangement and (ii) a liquid crystal display device.

Solution to Problem

In order to attain the above object, a backlight unit in accordance with the present invention is an edge light type backlight unit including: a light guide plate; and a light source provided so as to face one end surface of the light guide plate, said edge light type backlight unit causing light that has entered the light guide plate through the one end surface to be emitted in the form of plane emission from one main surface of the light guide plate, an opposite end surface of the light guide plate, which opposite end surface is opposite to the one end surface of the light guide plate, having one or more protrusion(s) protruding in a peak direction of light that is emitted from the light source, and a surface(s) of the protrusion(s) being constituted by (i) two or more inclined surfaces each of which is inclined relative to a direction perpendicular to the one main surface or (ii) one or more curved surface(s) curved relative to the direction perpendicular to the one main surface.

In this Description, a direction in which a part of light that is emitted from the light source travels, which part shows a peak luminance is referred to as the peak direction. According to the arrangement described above, a part of light that is emitted from the light source, which part is parallel to the peak direction, reaches the opposite end which is on the side opposite to the light source.

Note here that the opposite end surface of the light guide plate is inclined or curved relative to the peak direction. Therefore, light that has reached the opposite end is reflected by the opposite end surface and returns into the light guide plate. This reduces diffuse reflection of light in the vicinity of the opposite end, thereby reducing light energy loss.

Note that, in a case where the opposite end surface has two or more protrusions protruding in the peak direction, such a case can also be expressed as follows: a reflective end surface has a depression and a protrusion on the peak direction side.

Further, since the opposite end surface has a simple shape such as an inclined surface or a curved surface, it is possible to easily form the opposite end surface by for example injection molding of the light guide plate.

As such, according to the arrangement, it is possible to provide a backlight unit in which light use efficiency has been improved with a simple arrangement.

In order to attain the above object, a liquid crystal display device in accordance with the present invention includes the foregoing backlight unit and a liquid crystal panel.

According to the arrangement, since diffuse reflection of light in the vicinity of the opposite end of the light guide plate is reduced, generation of a bright line is prevented. This makes it possible to provide a liquid crystal display device that is excellent in luminance and display quality.

Additional objects, features and strengths of the present invention will be made clear by the description below. Further, the advantages of the present invention will be evident from the following explanation in reference to the drawings.

Advantageous Effects of Invention

A backlight unit in accordance with the present invention is an edge light type backlight unit including: a light guide plate; and a light source provided so as to face one end surface of the light guide plate, said edge light type backlight unit causing light that has entered the light guide plate through the one end surface to be emitted in the form of plane emission from one main surface of the light guide plate, an opposite end surface of the light guide plate, which opposite end surface is opposite to the one end surface of the light guide plate, having one or more protrusion(s) protruding in a peak direction of light that is emitted from the light source, and being constituted by (i) two or more inclined surfaces each of which is inclined relative to a direction perpendicular to the one main surface or (ii) one or more curved surface(s) curved relative to the direction perpendicular to the one main surface. Therefore, it is possible to provide a planar light source unit in which luminance has been improved with a simple arrangement.

BRIEF DESCRIPTION OF DRAWINGS

FIG. 1 is a cross-sectional view schematically showing an arrangement of a liquid crystal display device in accordance with one embodiment of the present invention.

FIG. 2 is a cross-sectional view showing another example of a light guide plate shown in FIG. 1.

DESCRIPTION OF EMBODIMENTS

Figure 3:
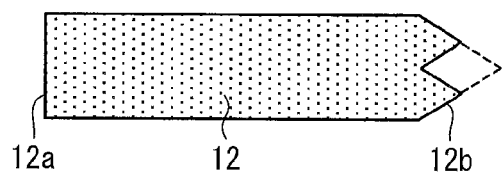
FIG. 3 is a cross-sectional view showing a further example of the light guide plate shown in FIG. 1.

The following description discusses, with reference to the drawings, one embodiment of a liquid crystal display device in accordance with the present invention. Note, however, that the present invention is not limited to the following embodiment.

(Arrangement of Liquid Crystal Display Device 100)

The following description discusses a schematic arrangement of the liquid crystal display device 100 with reference to FIG. 1. FIG. 1 is a cross-sectional view schematically showing an arrangement of the liquid crystal display device 100 of the present embodiment.

The liquid crystal display device 100 includes (i) a backlight unit 10 and (ii) a liquid crystal panel 20 provided on top of the backlight unit 10. Note here that the liquid crystal panel 20 can be a known liquid crystal panel, and is not limited to a particular kind.

The backlight unit 10 includes a light source 1, a light guide plate 2, a frame 3, a reflective sheet 4, and an optical sheet 5. The backlight unit 10 is an edge light type backlight unit, which causes light that has been emitted from the light source 1 and entered the light guide plate 2 through a light entrance end surface 2a to be emitted from one main surface of the light guide plate 2.

The following description discusses each feature of the backlight unit 10. Note that, in the description below, for convenience of description, one main surface of the light guide plate 2 through which plane light exits is referred to as a top surface, and another main surface opposite to the one main surface is referred to as a bottom surface.

The light source 1 is provided so as to face the light entrance end surface (one end surface) 2a, which is at least one end surface of the light guide plate 2. The light source 1 emits light towards the light entrance end surface 2a. In the present embodiment, the light source 1 is a light emitting diode (LED).

Light that is emitted from the light source 1 has some directivity. In the following description, a direction in which a part of light that is emitted from the light source 1 travels, which part has the highest luminance, is referred to as a peak direction. In FIG. 1, the peak direction is indicated by an arrow that extends from the light source 1 to the right. Note that FIG. 1 shows a cross section in a direction perpendicular to the top surface (the thickness direction of the light guide plate 2) and in the peak direction.

The light guide plate 2 is a transparent plate provided so as to face the liquid crystal panel 20. On the light entrance end surface 2a side of the light guide plate 2, the light source 1 is provided. The light entrance end surface 2a and the opposite end surface 2b which is opposite to the light entrance end surface 2a of the light guide plate 2 are on the peak direction of light that is emitted from the light source 1.

The opposite end surface 2b of the light guide plate 2 has a protrusion protruding in the peak direction. For example, in the present embodiment, the opposite end surface 2b is constituted by two inclined surfaces that are inclined relative to the thickness direction of the light guide plate 2. In this case, it is preferable that the opposite end surface 2b corresponds to two equal sides of a triangular shape in FIG. 1.

Note that, in the light guide plate 2, an angle at which the opposite end surface 2b is inclined relative to the thickness direction of the light guide 2 is not particularly limited. The angle can be set as appropriate in consideration of a refractive index etc. so that the opposite end surface 2b reflects light parallel to the peak direction.

The light guide plate 2 arranged like above can be formed suitably from resin etc. by injection (injection molding).

The frame 3 contains and holds the light source 1, the light guide plate 2 and the like. The frame 3 is preferably arranged such that its part that faces the opposite end surface 2b of the light guide plate 2 has a depression and/or a protrusion that fits the shape of the opposite end surface 2b. This makes it possible to more suitably reflect light that has reached the opposite end surface 2b.

The reflective sheet 4 is provided so as to face the bottom surface of the light guide plate 2. The reflective sheet has light reflectivity, and reflects light that is emitted through the bottom surface of the light guide plate 2 into the light guide plate 2.

The optical sheet 5 is provided so as to face the top surface of the light guide plate 2. The optical sheet 5 is arranged to uniformize and collects light that is emitted through the top surface of the light guide plate 2 so that the light strikes the liquid crystal panel 20.

According to the backlight unit 10 arranged like above, light emitted from the light source 1 enters the light guide plate 2 through the light entrance end surface 2a, and propagates through the light guide plate 2 while being reflected. The light propagating through the light guide plate 2 is reflected by the reflective sheet 4, is emitted through the top surface of the light guide plate 2, and then is emitted (in the form of plane emission) to the liquid crystal panel 20 via the optical sheet 5.

Note here that a part of light that is emitted from the light source 1, which part shows the highest luminance, travels straight from the light entrance end surface 2a and reaches the opposite end surface 2b. Since the opposite end surface 2b has inclined surfaces inclined relative to the peak direction which is a direction in which the light travels, the light which has reached the opposite end surface 2b is reflected by the inclined surfaces so as to return into the light guide plate 2. In particular, in a case where the opposite end surface 2b corresponds to two equal sides of a triangular shape in FIG. 1, it is possible to reflect the light more suitably.

Note that, depending on the angles of the inclined surfaces of the opposite end surface 2b, light that has reached the opposite end surface 2b can be reflected by one of the inclined surfaces of the opposite end surface 2b and then by the other of the inclined surfaces so as to return into the light guide plate 2.

In this way, light that has been reflected by the opposite end surface 2a and returned into the light guide plate 2 is finally emitted toward the liquid crystal panel 20 through the top surface of the light guide plane 2.

Therefore, according to the backlight unit 10 of the present embodiment, light is less reflected by diffuse reflection in the vicinity of the opposite end surface 2b, and thus light use efficiency is improved. This makes it possible to improve the luminance of the backlight unit 10 by approximately 3%. In addition, such increased luminance contributes to a decrease in power consumption of the backlight unit 10. This makes it possible to reduce power consumption of the liquid crystal display device 100.

Further, since light is less reflected by diffuse reflection in the backlight unit 10, display quality of the liquid crystal display device 100 is improved.

(Modified Examples of Light Guide Plate 2)

The shape of the opposite end surface 2b of the light guide plate 2 is not limited to the shape shown in FIG. 1. The following description discusses modified examples of the light guide plate 2.

As shown in FIG. 2, the opposite end surface 2b of the light guide plate 2 can be constituted by a curved surface that is curved relative to the thickness direction of the light guide plate 2. FIG. 2 is a view showing a light guide plate 6 in accordance with a modified example. In FIG. 2, it is preferable that an opposite end surface 6b corresponds to an arc of a rounded shape. Note that to what degree the opposite end surface 6b is curved relative to the thickness direction of the light guide plate 6 is not particularly limited. Therefore, for example the degree can be set as appropriate in consideration of a refractive index etc. so that light parallel to the peak direction is reflected.

According to the modified example shown in FIG. 2, since light that has reached the opposite end surface 6b is reflected by the curved surface and returns into the light guide plate 2, it is possible to reduce diffuse reflection of light in the vicinity of the opposite end surface 6b as is the case with the embodiment shown in FIG. 1.

Alternatively, the opposite end surface 2b of the light guide plate 2 can be constituted by two or more inclined surfaces or two or more curved surfaces so as to have two or more protrusions protruding in the peak direction.

For example, as indicated by a solid line in FIG. 3, an opposite end surface 12b of a light guide plate 12 in accordance with a modified example can be constituted by four inclined surfaces so as to have two protrusions protruding in the peak direction. FIG. 3 is a cross-sectional view showing the light guide plate 12 in accordance with the modified example. In this case, the opposite end surface 12b preferably corresponds to two equal sides of each of two triangular shapes in FIG. 3.

Figure 4:
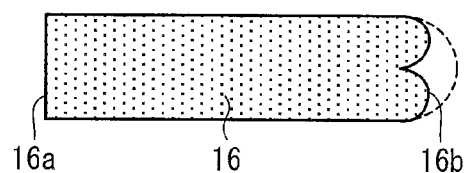
FIG. 4 is a cross-sectional view showing still a further example of the light guide plate shown in FIG. 1.

Alternatively, for example, as indicated by a solid line in FIG. 4, an opposite end surface 16b of a light guide plate 16 in accordance with a modified example can be constituted by two curved surfaces so as to have two protrusions protruding in the peak direction. FIG. 4 is a cross-sectional view showing the light guide plate 16 in accordance with the modified example. In this case, the opposite end surface 16b preferably corresponds to an arc of each of two rounded shapes in FIG. 4.

According to modified examples shown in FIGS. 3 and 4, since light that has reached the opposite end surface is reflected by an inclined surface or a curved surface and returns into the light guide plate, it is possible to reduce diffuse reflection of light in the vicinity of the opposite end surface as is the case with the embodiment shown in FIG. 1.

Note that the number of the foregoing protrusions of the opposite end surface 2b of the light guide plate 2 is not limited to those described above. The number can be a larger number.

Further note that, also in a case of using a light guide plate in accordance with such modified examples, it is preferable that the frame 3 has a depression and/or a protrusion that fits the shape of the opposite end surface of the light guide plate.

(Other Effects)

The backlight unit 10 in accordance with the present embodiment is advantageous also in reducing its outer size. Such an advantage is described with reference to FIG. 5.

Note that, as a comparative example, a light guide plate having an opposite end surface constituted by a single inclined surface is used.

Figure 5:
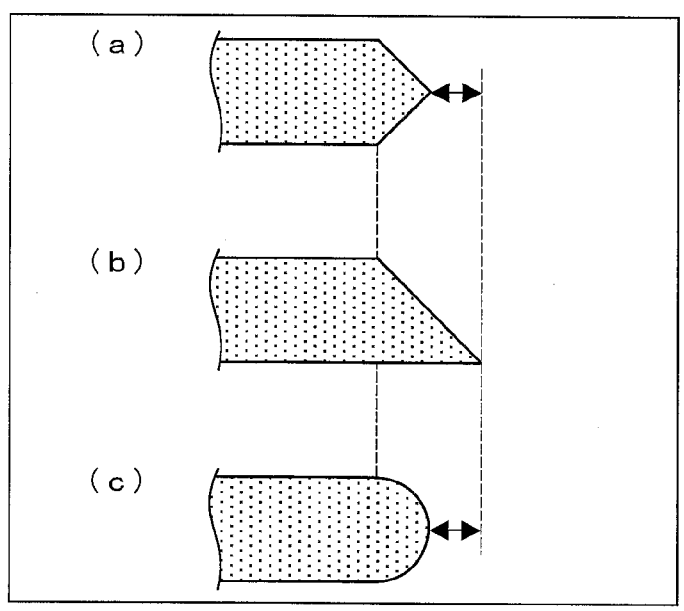
FIG. 5 is a view showing a backlight unit in accordance with the present invention and comparative examples thereof.
Figure 6:
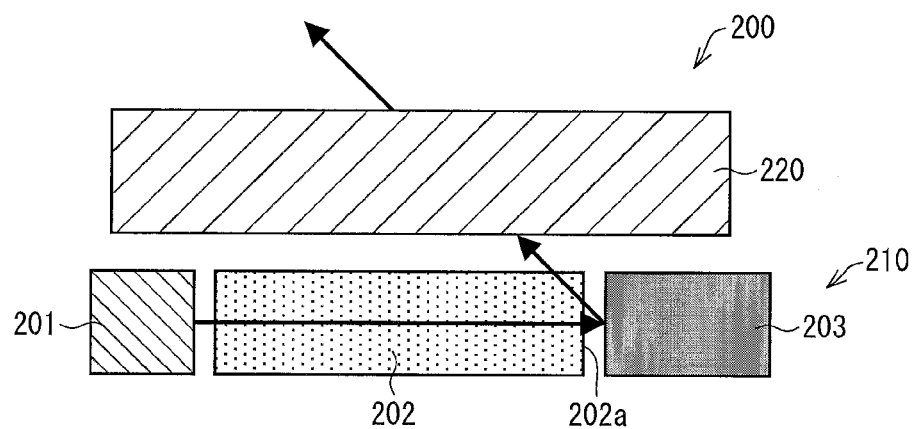
FIG. 6 is a cross-sectional view schematically showing an arrangement of a liquid crystal display device in accordance with a conventional example.
Figure 7:
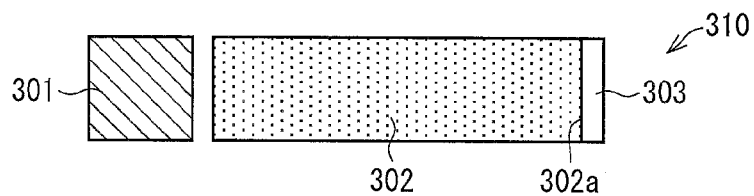
FIG. 7 is a cross-sectional view showing a backlight unit in accordance with another conventional example.

FIG. 5 is a view schematically showing an opposite end surface of each light guide plate. (a) of FIG. 5 shows an opposite end surface 2b in accordance with the present embodiment, (b) of FIG. 5 shows an opposite end surface in accordance with a comparative example, and (c) of FIG. 5 shows an opposite end surface 6b in accordance with another example of the present embodiment. Note that (a) to (c) of FIG. 5 each show a cross section in the thickness direction of the light guide plate and in the peak direction.

Each of the opposite end surfaces shown in (a) to (c) of FIG. 5 is arranged to optimally reflect the light parallel to the peak direction. For example, the opposite end surface 2b shown in (a) of FIG. 5 and the opposite end surface shown in (b) of FIG. 5 are each at 45 degrees to the peak direction. Further, in (c) of FIG. 5, the opposite end surface 6b arcs.

According to (a) to (c) of FIG. 5, a distance from the inside (an intersection of (i) the top surface of the light guide plate and (ii) an inclined surface or a curved surface) of the opposite end surface to the outside (an end of the light guide plate) of the opposite end surface is shorter in the present embodiment ((a) and (b) of FIG. 5) than in the comparative example ((b) of FIG. 5). In other words, according to the present embodiment, it is possible to improve light use efficiency of the backlight unit 10 without increasing the length of the outer size of the light guide plate 2.

Further, by designing the light guide plate 2 such that the number of protrusions of the opposite end surface 2b is larger, it is possible to further reduce the outer size of the light guide plate 2.

For example, in FIG. 3, a dotted line indicates the opposite end surface 2b which has a single protrusion. It is clear from FIG. 3 that, in a case where the angles of inclination of inclined surfaces are the same, an opposite end surface that has two protrusions more contributes to a reduction in outer size of the light guide 2 than an opposite end surface 12*b* which has a single protrusion.

Similarly, in FIG. 4, a dotted line indicates the opposite end surface 6*b* which has a single protrusion. It is clear from FIG. 4 that, in a case where degrees of curve of curved surfaces are the same, an opposite end surface that has two protrusions more contributes to a reduction in outer size of the light guide plate 2 than an opposite end surface that has a single protrusion.

Note that the present invention is not limited to the foregoing embodiments, but rather can be applied in many variations by persons skilled in the art within the scope of the claims. That is, a new embodiment can be obtained from a proper combination of modified technical means, provided such embodiment does not exceed the scope of the claims. In other words, the embodiments described in the foregoing description of embodiments serve solely to illustrate the technical details of the present invention, which should not be narrowly interpreted within the limits of such embodiments and concrete examples, but rather can be applied within the spirit of the present invention, provided such variations do not exceed the scope of the patent claims set forth below.

OVERVIEW OF THE PRESENT INVENTION

In order to attain the foregoing object, a backlight unit in accordance with the present invention is an edge light type backlight unit including: a light guide plate; and a light source provided so as to face one end surface of the light guide plate, said edge light type backlight unit causing light that has entered the light guide plate through the one end surface to be emitted in the form of plane emission from one main surface of the light guide plate, an opposite end surface of the light guide plate, which opposite end surface is opposite to the one end surface of the light guide plate, having one or more protrusion(s) protruding in a peak direction of light that is emitted from the light source, and being constituted by (i) two or more inclined surfaces each of which is inclined relative to a direction perpendicular to the one main surface or (ii) one or more curved surface(s) curved relative to the direction perpendicular to the one main surface.

According to the arrangement, a part of light that is emitted from the light source, which part is parallel to the peak direction, reaches an opposite end that is on the opposite side of the light source.

Note here that the opposite end surface of the light guide plate is inclined or curved relative to the peak direction. Therefore, the light which has reached the opposite end is reflected by the opposite end surface and returns into the light guide plate. This reduces diffuse reflection of light in the vicinity of the opposite end, thereby reducing light energy loss.

Note that, in a case where the opposite end surface has two or more protrusions protruding in the peak direction, such a case can also be expressed as follows: a reflective end surface has a depression and a protrusion on the peak direction side.

Further, since the opposite end surface has a simple shape such as an inclined surface or a curved surface, it is possible to easily form the opposite end surface by for example injection molding of the light guide plate.

As such, according to the arrangement, it is possible to provide a backlight unit in which light use efficiency has been improved with a simple arrangement.

Further, the backlight unit in accordance with the present invention is preferably arranged such that the opposite end surface of the light guide plate is constituted by the two or more inclined surfaces; and the opposite end surface corresponds to two equal sides of one or more triangular shape(s) in a cross section both in the direction perpendicular to the main surface and in the peak direction.

According to the arrangement, since light that has reached the opposite end surface is reflected more suitably, it is possible to further improve light use efficiency.

Further, the backlight unit in accordance with the present invention is preferably arranged such that the opposite end surface of the light guide plate is constituted by the one or more curved surface(s); and the opposite end surface corresponds to an arc of one or more rounded shape(s) in a cross section both in the direction perpendicular to the main surface and in the direction.

According to the arrangement, since the light which has reached the opposite end surface is reflected more suitably, it is possible to further improve light use efficiency.

Further, the backlight unit in accordance with the present invention preferably further includes a frame for holding the light guide plate and the light source, and is arranged such that a part of the frame, which part faces the opposite end surface, has a shape that fits the opposite end surface.

According to the arrangement, since the light which has reached the opposite end surface is reflected more suitably, it is possible to further improve light use efficiency.

In order to attain the foregoing object, a liquid crystal display device in accordance with the present invention includes the foregoing backlight unit and a liquid crystal panel.

According to the arrangement, since diffuse reflection of light in the vicinity of the opposite end of the light guide plate is reduced, generation of a bright line is prevented. This makes it possible to provide a liquid crystal display device that is excellent in luminance and display quality.

Moreover, according to the arrangement, since power consumption of a planar light source unit is reduced, it is possible to reduce power consumption of the liquid crystal display device.

INDUSTRIAL APPLICABILITY

The present invention can be extensively used in energy-efficient backlight units and energy-efficient liquid crystal display devices.

REFERENCE SIGNS LIST

1 Light source
2, 6, 12, 16 Light guide plate
2*a*, 6*a*, 12*a*, 16*a* Light entrance end surface
2*b*, 6*b*, 12*b*, 16*b* Opposite end
3 Frame
4 Reflective sheet
5 Optical sheet
10 Backlight unit
20 Liquid crystal display panel
100 Liquid crystal display device

The invention claimed is:
1. An edge light type backlight unit comprising:
a light guide plate;
a light source provided so as to face one end surface of the light guide plate; and
a frame holding the light guide plate and the light source; and
said edge light type backlight unit causing light that has entered the light guide plate through the one end surface to be emitted in the form of plane emission from one main surface of the light guide plate, an opposite end surface of the light guide plate, which opposite end surface is opposite to the one end surface of the light guide plate, having one or more protrusion(s) protruding in a peak direction of light that is emitted from the light source, a surface(s) of the protrusion(s) being constituted by (i) two or more inclined surfaces each of which is inclined relative to a direction perpendicular to the one main surface or (ii) one or more curved surface(s) curved relative to the direction perpendicular to the one main surface, and a portion of the frame, which portion faces the opposite end surface, has a shape that fits the opposite end surface.

2. The backlight unit as set forth in claim 1, wherein:

the opposite end surface of the light guide plate is constituted by the two or more inclined surfaces; and the opposite end surface corresponds to two equal sides of one or more triangular shape(s) in a cross section both in the direction perpendicular to the main surface and in the peak direction.

3. The backlight unit as set forth in claim 1, wherein:

the opposite end surface of the light guide plate is constituted by the one or more curved surface(s); and the opposite end surface corresponds to an arc of one or more rounded shape(s) in a cross section both in the direction perpendicular to the main surface and in the peak direction.

4. A liquid crystal display device comprising:

a backlight unit recited in claim 1; and a liquid crystal panel.

\* \* \* \* \*